United States Patent [19]

Lileck et al.

[11] 4,193,976
[45] Mar. 18, 1980

[54] REMOVAL OF DINITROGEN DIFLUORIDE FROM NITROGEN TRIFLUORIDE

[75] Inventors: John T. Lileck, Tamaqua; John Papinsick, Summit Hill; Edward J. Steigerwalt, Lehighton, all of Pa.

[73] Assignee: Air Products & Chemicals, Inc., Allentown, Pa.

[21] Appl. No.: 894,114

[22] Filed: Apr. 6, 1978

[51] Int. Cl.$^2$ .................................................. C01B 21/52
[52] U.S. Cl. ........................................ 423/406; 423/240; 423/489
[58] Field of Search ............................. 423/406, 489

[56] References Cited

U.S. PATENT DOCUMENTS

| | | | |
|---|---|---|---|
| 3,109,711 | 11/1963 | Lawton et al. | 423/406 |
| 3,181,305 | 5/1965 | Schoenfelder | 423/489 |
| 3,214,237 | 10/1965 | Morrow | 423/406 |
| 3,304,248 | 2/1967 | Fullam et al. | 423/406 |
| 3,356,454 | 12/1967 | Tompkins et al. | 423/408 |

OTHER PUBLICATIONS

Colburn, C. et al., "Difluorodiazine" in *J. Am. Chem. Soc.* vol. 81 (1959), pp. 6397, 6398.

*Primary Examiner*—Brian Hearn
*Attorney, Agent, or Firm*—Russell L. Brewer; E. Eugene Innis

[57] ABSTRACT

This invention relates to a process for purifying a nitrogen trifluoride containing atmosphere contaminated with dinitrogen difluoride. The atmosphere is purified by heating the nitrogen trifluoride atmosphere in the presence of a particulate metal capable of defluorinating dinitrogen difluoride, but inert to nitrogen trifluoride, preferably the metal being selected from the group consisting of iron, cobalt, and nickel, to a temperature of from about 300°–1000° F. for a time sufficient to effect defluorination of the dinitrogen difluoride.

8 Claims, No Drawings

REMOVAL OF DINITROGEN DIFLUORIDE FROM NITROGEN TRIFLUORIDE

BACKGROUND OF THE INVENTION

1. Field

This invention relates to an improved process for removing dinitrogen difluoride from a nitrogen trifluoride containing atmosphere.

2. Description of the Prior Art

In the mid 1960's nitrogen trifluoride processes were developed with the nitrogen trifluoride being used primarily for the synthesis of high energy liquid and solid propellants. In recent years the uses of nitrogen trifluoride have changed and now the nitrogen trifluoride, because of its stability under pressure, is being used as a fluorine source for the synthesis of fluorocarbons or as an oxidizer in lasers.

Nitrogen trifluoride can be prepared by several processes, these processes being described in U.S. Pat. Nos. 3,304,248; 3,181,305; 3,356,454; and 3,214,237. The earlier processes used for the preparation of nitrogen trifluoride involved the electrolysis of ammonium bifluoride. In that process ammonia and hydrogen fluoride were introduced into a molten bath of ammonium bifluoride and an electric current was applied to generate nitrogen trifluoride.

Another process for producing nitrogen trifluoride involved the fluorination of ammonia in the presence of a copper catalyst at temperatures from about 0°–50° C.

Another process involved the fluorination of nitrogen and there nitrogen and fluorine were passed through a plasma arc at a temperature of at least 1,000° C.

Basic to each of these processes is the production of other nitrogen fluorides particularly dinitrogen difluoride (difluorodiazine) which must be removed. However, as the art has recognized, difluorodiazine is difficult to remove from a nitrogen trifluoride containing atmosphere. (See U.S. Pat. No. 3,109,711.)

The basic processes employed in removing dinitrogen difluoride from nitrogen trifluoride atmospheres, particularly in the off-gases from the nitrogen trifluoride synthesis reactor have involved adsorption of the dinitrogen difluoride or cryogenic separation and fractionation. U.S. Pat. No. 3,356,454 shows removing difluorodiazine from nitrogen trifluoride containing atmospheres by the use of adsorption equipment filled with an adsorbent material such as silica gel and synthetic zeolite. Temperatures associated with adsorption were about 0° C.

U.S. Pat. No. 3,181,305 discloses a process for separating a tetrafluorohydrazine and nitrous oxide from a nitrogen trifluoride containing atmosphere by cooling the atmosphere to a temperature sufficient to solidify the nitrous oxide, filtering the nitrous oxide from the system, and then cooling to a temperature of −160° C. and separating the liquid nitrogen trifluoride from the immiscible liquid tetrafluorohydrazine.

U.S. Pat. No. 3,214,237 which discloses a process for producing nitrogen trifluoride shows the use of a fractionation procedure for removing dinitrogen difluoride. In this patent the reactor gases are passed through a series of cold traps maintained at −196° C. to produce condensates of nitrogen trifluoride and other nitrogen fluorides such as dinitrogen tetrafluoride and dinitrogen difluoride. These nitrogen fluorides are separated by fractional vaporization or distillation.

The two major disadvantages of separating dinitrogen difluoride from a nitrogen trifluoride containing atmosphere by the prior art techniques are as follows:

(1) The adsorption often is not selective to dinitrogen difluoride, but also can adsorb a significant quantity of nitrogen trifluoride, particularly at low temperatures. This nitrogen trifluoride is lost on regeneration of the adsorbers, and (2) fractional distillation of the nitrogen trifluoride atmosphere inherently results in concentrating difluorodiazine, and when it is in concentrated form, difficulties in handling can exist as the product exhibits a tendency to decompose.

SUMMARY OF THE INVENTION

This invention relates to a process for selectively removing dinitrogen difluoride from a nitrogen trifluoride containing atmosphere to levels below about 0.1% and preferably below about 0.01% by volume. The process comprises contacting the nitrogen trifluoride containing atmosphere, contaminated with dinitrogen difluoride in an amount not exceeding about 5%, by volume with a particulate metal sufficiently reactive to defluorinate dinitrogen difluoride, but inert to nitrogen trifluoride in a reaction zone, maintaining a temperature in said reaction zone sufficient to effect defluorination of the dinitrogen difluoride and effecting said contacting for a time sufficient to obtain the desired dinitrogen difluoride concentration.

Several advantages are associated with this process, those being:

the ability to selectively remove dinitrogen difluoride from an atmosphere containing nitrogen trifluoride without significant loss of nitrogen trifluoride;

the ability to remove dinitrogen difluoride to extremely low levels, e.g., 0.1%, and typically less than 0.01% by volume; and the ability to avoid high concentrations of unstable dinitrogen difluoride and thus eliminating the hazards associated with the handling.

DESCRIPTION OF THE PREFERRED EMBODIMENTS

Nitrogen trifluoride containing atmospheres which can be treated by the present process are those generally containing at least 10% nitrogen trifluoride contaminated with not more than about 5% dinitrogen difluoride by volume and preferably from 20–95% nitrogen trifluoride and less than 5% dinitrogen difluoride. Typically, the atmosphere is obtained from the synthesis of nitrogen trifluoride either by the electrolysis of ammonium bifluoride or by the direct fluorination of ammonia in the presence of molten ammonium bifluoride as set forth in copending application having U.S. Ser. No. 788,724 and a filing date of Apr. 19, 1977, now U.S. Pat. No. 4,091,081. Typically, the gas composition from the nitrogen trifluoride reactor contains at least 15% $NF_3$, and generally, the following components and volume percentage range.

| | |
|---|---|
| Nitrogen Trifluoride | 15–25% |
| Dinitrogen Difluoride | 0.5–2% |
| Nitrous Oxide | 0–2% |
| Nitrogen | balance e.g. 65–85% |
| Fluorine | 0.25–2.5% |
| HF (calculated) | 1–10% |

Except for the dinitrogen difluoride or difluorodiazine as it is sometimes referred, the other contaminants can be removed by various scrubbing or the product separated by various condensation techniques. The dinitrogen difluoride as shown is generally present in a proportion of not more than 5% by volume and typically, in nitrogen trifluoride processes, it is present in an amount less than 2%. It is this fraction which should be reduced to less than 100 ppm in order to use the nitrogen trifluoride product as a fluorine source.

We have found that the dinitrogen difluoride can be selectively defluorinated without effecting significant reduction of the nitrogen trifluoride, e.g., less than 2% reduction by passing the nitrogen trifluoride containing atmosphere through a reaction zone containing particulate metal under specified conditions.

The metal in practicing the invention, must be sufficiently reactive to defluorinate the dinitrogen difluoride, but inert to the nitrogen trifluoride. By inert it is meant that not more than 3.5 grams nitrogen trifluoride will react with 100 grams elemental spheres of ⅛ inch in diameter when at a temperature of 500° F., and atmospheric pressure in a 100 second time period. In addition, the metal can be in alloy form, e.g. as in Monel steel and stainless steel. A small proportion of elemental metal which may be reactive with nitrogen trifluoride, e.g., copper, may be included even though it is not inert to nitrogen trifluoride provided that the alloy as a whole is inert by the above standard. Generally, the metal used in the process consists of stainless steel, carbon steel, copper, aluminum, zinc, lead, nickel, iron and cobalt or alloy thereof with nickel being the preferred metal.

In particulate form, these metals provide a surface which can selectively defluorinate the dinitrogen difluoride, presumably to nitrogen. Hence, significant quantities of metal fluorides are formed as the atmosphere is passed through the reaction zone. The metals should be from about 1/64 inch to about 2 inches on a side and preferably should be spherical with diameters of from about ⅛ inch to ½ inch. Another form that is acceptable are small sheets, usually about ⅛-¼ inch on a side, preferably perforated with holes about the size of a straight pin. Such forms are commercially available.

In the reaction zone, it is believed the metal does two things; one it provides a surface which can react with the dinitrogen difluoride to selectively defluorinate that compound and produce a metal fluoride and free nitrogen, and two it acts as a heat sink thereby dissipating any heat that might cause thermal decomposition of nitrogen trifluoride.

To effect defluorination of dinitrogen difluoride or rather effect a purification of the nitrogen trifluoride containing atmosphere by decomposing the dinitrogen difluoride, the atmosphere is passed through the reaction zone at a temperature generally from about 300° to 1,000° F., and preferably at a temperature from about 400° to 700° F. Although the minimum temperature that can be used is that which is sufficient to effect decomposition of the dinitrogen difluoride, temperatures much below about 300° F. require longer reaction times to effect defluorination of the $N_2F_2$, and often at such longer reaction times there is a greater loss of $NF_3$.

The $NF_3$ atmosphere should be maintained in the reaction zone for a period of time sufficient to effect at least partial defluorination of the dinitrogen difluoride. To effect significant defluorination, i.e., generally a period of about 1 second to about 1000 seconds is employed. Typically, in commercial equipment using nickel as the metal, a contact period of about 3–10 seconds is used to reduce the level of $N_2F_2$ from about 1–2% to 0.05% or lower. Generally, the reaction time is inversely proportional to the reaction temperature, thus longer reaction times require the lower temperatures and shorter reaction times require higher temperatures. The basic limitation with respect to residence time is the ability to remove heat, as defluorination of $N_2F_2$ proceeds almost instantaneously. As to an upper limit, the time should be adjusted to maintain $NF_3$ decomposition to less than 2% and effect desirable reduction in $N_2F_2$. When operating in a range from about 400° to 700° F., the atmosphere typically is maintained in the reaction zone for a period of about 3 to 10 seconds. With nickel balls of about ⅛ inch in diameter, or nickel sheets, selective defluorination of dinitrogen difluoride can be consistently obtained to less than 0.05% by volume with less than about 1% of the $NF_3$ present being decomposed.

The following examples are provided to illustrate preferred embodiments of the invention are not intended to restrict the scope thereof. All parts are parts by weight and all percentages are expressed as weight percentages except where gas compositions are given and then all gas percentages are volume percent.

EXAMPLE 1

A reactor which comprised a two-inch, schedule 40 nickel pipe, 26 inches in length was fitted with a perforated plate at the bottom and filled to a height of 24 inches with about a 50—50 combination by volume of ⅛ inch spherical nickel balls and nickel protruded packing, the protruded packing being angle shaped having a dimension of about 0.24 inches and about 0.05 in thickness. Each side is perforated with a plurality of pinholes to increase the surface area. Electrical heating strips were attached to the outside wall of the reactor and coupled to a temperature indicator controller for maintaining the appropriate temperature.

Nitrogen trifluoride process gas obtained by the direct fluorination of ammonia in the presence of ammonium bifluoride and having the following concentration:

| | |
|---|---|
| Nitrogen Trifluoride | 20.5% |
| Dinitrogen Difluoride | 0.57% |
| Helium (from $NF_3$ process) | 55.05% |
| Nitrogen | 24.4% |
| Carbon Tetrafluoride | 0.02% |

The process gas was passed through the reactor at a rate of 4.8 scfh to give a residence time of about 37 seconds. As the gas was passed through the reactor, the temperature was increased. The gases obtained from the reactor were analyzed for nitrogen trifluoride and dinitrogen difluoride content. Table I below indicates the concentration of nitrogen trifluoride and dinitrogen difluoride at the following reaction temperatures:

| Temp °F. | % $NF_3$ | % $N_2F_2$ | % $NF_3$/% $N_2F_2$ |
| --- | --- | --- | --- |
| 175 | 19.4 | 0.52 | 37.31 |
| 180 | 21.2 | 0.447 | 47.43 |
| 182 | 19.54 | 0.43 | 45.55 |
| 223 | 22.5 | 0.607 | 37.07 |
| 376 | 18.89 | 0.491 | 38.47 |
| 405 | 19.01 | 0.190 | 100.05 |
| 409 | 19.38 | 0.067 | 289.25 |
| 413 | 24.02 | 0.061 | 393.77 |
| 414 | 19.12 | 0.078 | 245.13 |
| 440 | 19.54 | 0.048 | 407.08 |
| 468 | 19.50 | 0.021 | 928.57 |

These results show that the nitrogen trifluoride concentration was only slightly influenced by the nickel filled reactor while the dinitrogen difluoride concentration was substantially affected and a reduced level of 0.02% was attained. Even though the $NF_3$ concentration varied the ratio of % $NF_3$/% $N_2F_2$ increased substantially with the ratio increasing at a faster rate at temperatures above 400° F.

EXAMPLE 2

The process of Example 1 was repeated except that the process gas used for purification was formulated from cylinder gas. The initial composition of the cylinder gas was:

|  | Air | % $CH_4$ | % $N_2O$ | % $N_2F_2$ | % $NF_3$ |
| --- | --- | --- | --- | --- | --- |
| Initial Analysis | 1.14 | 0.06 | Trace | 1.044 | 97.81 |

The cylinder gas was passed through the two-inch, schedule 40 nickel pipe filled with 50—50 mixture of nickel balls and nickel protruded packing at a flow rate of 0.5 standard cubic feet per hour (scfh). At a 0.5 scfh, the residence time of the gas while in contact with the nickel packing in the reactor was about 335 seconds. The temperature in the reactor was maintained between 650°–700° F. The off gas from the reactor was analyzed by gas chromatography and the analysis was as follows:

|  | Air | % $CH_4$ | % $N_2O$ | % $N_2F_2$ | % $NF_3$ |
| --- | --- | --- | --- | --- | --- |
| Off-Gas Analysis | 3.29 | 0.054 | Trace | Not Detected | 96.66 |

On comparing the off-gas analysis to the initial analysis, the results clearly show the elimination of dinitrogen difluoride from the gas mixture. Although the nitrogen trifluoride was reduced in substantially the same quantity, e.g., about 1.2% by volume, the 1.2% loss becomes insignificant because of the high concentration of nitrogen trifluoride present. As was shown in the Example 1, where the percent nitrogen trifluoride is present in a much lower quantity, the percent loss to decomposition or defluorination was insignificant. Analysis of the nickel balls after treatment of the gas indicated the presence of nickel fluoride. Thus it would appear the nickel balls would have to be regenerated after some length of time in order to effect decomposition of the dinitrogen difluoride.

Stability tests showed that $NF_3$ was relatively stable to temperatures of about 1100° F. with only about 2% decomposing at that temperature.

EXAMPLE 3

The procedure of Example 1 was repeated except that a synthetic zeolite 5 A molecular sieve was substituted for the nickel balls and packing. At a temperature of about 200°–220° F., the nitrogen trifluoride decomposed. Higher temperatures, e.g. to 300° F., showed a 40% decomposition with high levels, e.g. 4–14% nitric oxide.

When petroleum coke was substituted for the molecular sieve, decomposition of $NF_3$ was less. However, the petroleum coke was ineffective for removing dinitrogen difluoride.

EXAMPLE 4

The procedure of Example 2 was repeated using a gas having an initial analysis of 98.4% $NF_3$, 0.54% $N_2F_2$ and 0.98% air ($N_2/O_2$). The packing used was a 1/16 to ⅛ inch screen of Monel mesh wire rolled into a cylinder. The results were:

| T °F. | % Air | % $NF_3$ | % $N_2F_2$ | Ratio $NF_3/N_2F_2$ |
| --- | --- | --- | --- | --- |
| 59 | 1.5 | 97.93 | 0.55 | 178 |
| 130 | 0.98 | 98.4 | 0.60 | 164 |
| 180 | 1.0 | 98.34 | 0.64 | 154 |
| 212 | 1.35 | 98.32 | 0.31 | 317 |
| 351 | 1.75 | 98.20 | 0.05 | 1964 |
| 418 | 1.84 | 98.14 | <.01 | 9814 |
| 469 | 1.80 | 98.18 | <.01 | 9818 |
| 515 | 1.84 | 98.13 | 0.01 | 9813 |
| 227 | 1.05 | 98.50 | 0.43 | 229 |

The results show the Monel steel is effective for reducing the $N_2F_2$ content without reducing the $NF_3$ content when content with effecting the $NF_3$ xontent when defluorinating at a temperature of from 350° F. to 460° F.

EXAMPLE 5

The procedure of Example 4 was repeated except that a stainless steel 304 screen was employed. The results were:

| T °F. | % Air | % $NF_3$ | % $N_2F_2$ | Ratio $NF_3/N_2F_2$ |
| --- | --- | --- | --- | --- |
| 48 | 1.04 | 98.29 | 0.65 | 151 |
| 145 | 0.99 | 98.36 | 0.63 | 156 |
| 254 | 1.01 | 98.30 | 0.67 | 147 |
| 272 | 1.40 | 98.53 | 0.05 | 1971 |
| 374 | 1.73 | 98.20 | 0.04 | 2455 |
| 412 | 1.70 | 98.26 | 0.02 | 4913 |
| 452 | 1.79 | 98.19 | <.01 | 9819 |
| 536 | 1.67 | 98.3 | <.01 | 9830 |
| 266 | 1.20 | 98.38 | 0.40 | 246 |

The results show defluorination of $N_2F_2$ to proceed at about 270° F. with good results at the 450° F. and 530° F. level.

EXAMPLE 6

The procedure of Example 2 was repeated except that low carbon steel washers having a thickness of about 1/32 inch and a diameter of ½ inch were used as the packing. The results of the difluorination studies were:

| T °F. | % Air | % $NF_3$ | % $N_2F_2$ | Ratio $NF_3/N_2F_2$ |
| --- | --- | --- | --- | --- |
| 92 | 1.20 | 98.18 | 0.60 | 164 |
| 200 | 0.96 | 98.37 | 0.65 | 151 |

-continued

| T °F. | % Air | % NF$_3$ | % N$_2$F$_2$ | Ratio NF$_3$/N$_2$F$_2$ |
|---|---|---|---|---|
| 254 | 0.99 | 98.31 | 0.68 | 145 |
| 310 | 1.07 | 98.36 | 0.55 | 179 |
| 359 | 1.85 | 98.08 | 0.05 | 1962 |
| 407 | 1.63 | 98.12 | 0.23 | 427 |
| 433 | 1.82 | 98.04 | 0.12 | 817 |
| 511 | 1.72 | 98.15 | 0.11 | 892 |

These results show that low carbon steel washers were effective for reducing the N$_2$F$_2$ content, but not as effective as nickel in Example 1 or the Monel wire or stainless steel as in Examples 4 and 5.

EXAMPLE 7

The procedure of Example 2 was repeated except that aluminum chips were used as the packing. The chips were about ¼ by ¼ inch on a side. The results were:

| T °F. | % Air | % NF$_3$ | % N$_2$F$_2$ | Ratio NF$_3$/N$_2$F$_2$ |
|---|---|---|---|---|
| 80 | 1.13 | 98.24 | 0.61 | 161 |
| 219 | 0.98 | 98.37 | 0.63 | 156 |
| 260 | 1.12 | 98.17 | 0.69 | 142 |
| 328 | 1.1 | 98.36 | 0.52 | 189 |
| 380 | 1.8 | 98.14 | 0.04 | 2454 |
| 422 | 1.7 | 98.28 | <.01 | 9828 |
| 476 | 1.8 | 98.18 | <.01 | 9818 |
| 524 | 1.75 | 98.19 | 0.04 | 2455 |
| 303 | 1.5 | 98.34 | 0.14 | 702 |

EXAMPLE 8

The procedure of Example 7 was repeated except that ¼ inch O.D. copper tubes ¼ inch long were used as the packing. The results were:

| T °F. | % Air | % NF$_3$ | % N$_2$F$_2$ | Ratio NF$_3$/N$_2$F$_2$ |
|---|---|---|---|---|
| 56 | 1.3 | 98.02 | 0.66 | 149 |
| 158 | 1.1 | 98.16 | 0.72 | 136 |
| 259 | 1.0 | 98.30 | 0.68 | 145 |
| 226 | 1.3 | 97.95 | 0.73 | 134 |
| 308 | 1.7 | 98.20 | <0.01 | 9828 |
| 374 | 1.8 | 98.14 | 0.04 | 2454 |
| 403 | 1.7 | 98.25 | 0.035 | 2807 |

-continued

| T °F. | % Air | % NF$_3$ | % N$_2$F$_2$ | Ratio NF$_3$/N$_2$F$_2$ |
|---|---|---|---|---|
| 446 | 4.3 | 91.40 | 0.02 | 4570 |
| 528 | 1.8 | 98.16 | 0.02 | 2908 |
| 224 | 1.3 | 97.0 | 0.46 | 211 |

Again, the results show effectiveness of N$_2$F$_2$ reduction at about 300° F. with good results being obtained at the 500° F. level.

What is claimed is:

1. A process for purifying a nitrogen trifluoride containing atmosphere contaminated with dinitrogen difluoride in an amount not exceeding about 5% by volume which comprises selectively decomposing said dinitrogen difluoride while avoiding decomposition of said nitrogen trifluoride, said selective defluorination comprising the steps:

contacting the atmosphere with a particulate elemental metal which is inert to nitrogen trifluoride to the extent that not more than 3.5 grams nitrogen trifluoride will react with 100 grams of particulate elemental metal spheres of ⅛ inch in diameter when at a temperature of 500° F., and atmospheric pressure in a 100 second time period, said contacting being for a time and at a temperature effective for permitting selective defluorination.

2. The process of claim 1 wherein said temperature is maintained from about 300° F. to about 1,000° F.

3. The process of claim 2 wherein said reaction time is from about 1–1000 seconds.

4. The process of claim 2 wherein said particulate metal is at least 1/64 inch, but not more than 1 inch on a side, and is selected from the group consisting of nickel, cobalt and iron.

5. The process of claim 4 wherein in said atmosphere said nitrogen trifluoride is present in an amount greater than about 15% by volume and the percent dinitrogen difluoride is less than 2%.

6. The process of claim 5 wherein said dinitrogen difluoride is removed to a level below about 0.1% by maintaining a temperature of from 400°–700° F. in the reaction zone.

7. The process of claim 6 wherein said elemental metal particles are nickel spheres having a diameter of about ⅛–½ inch.

8. The process of claim 7 wherein said reaction time is from about 3–10 seconds.

* * * * *